Patented June 10, 1930

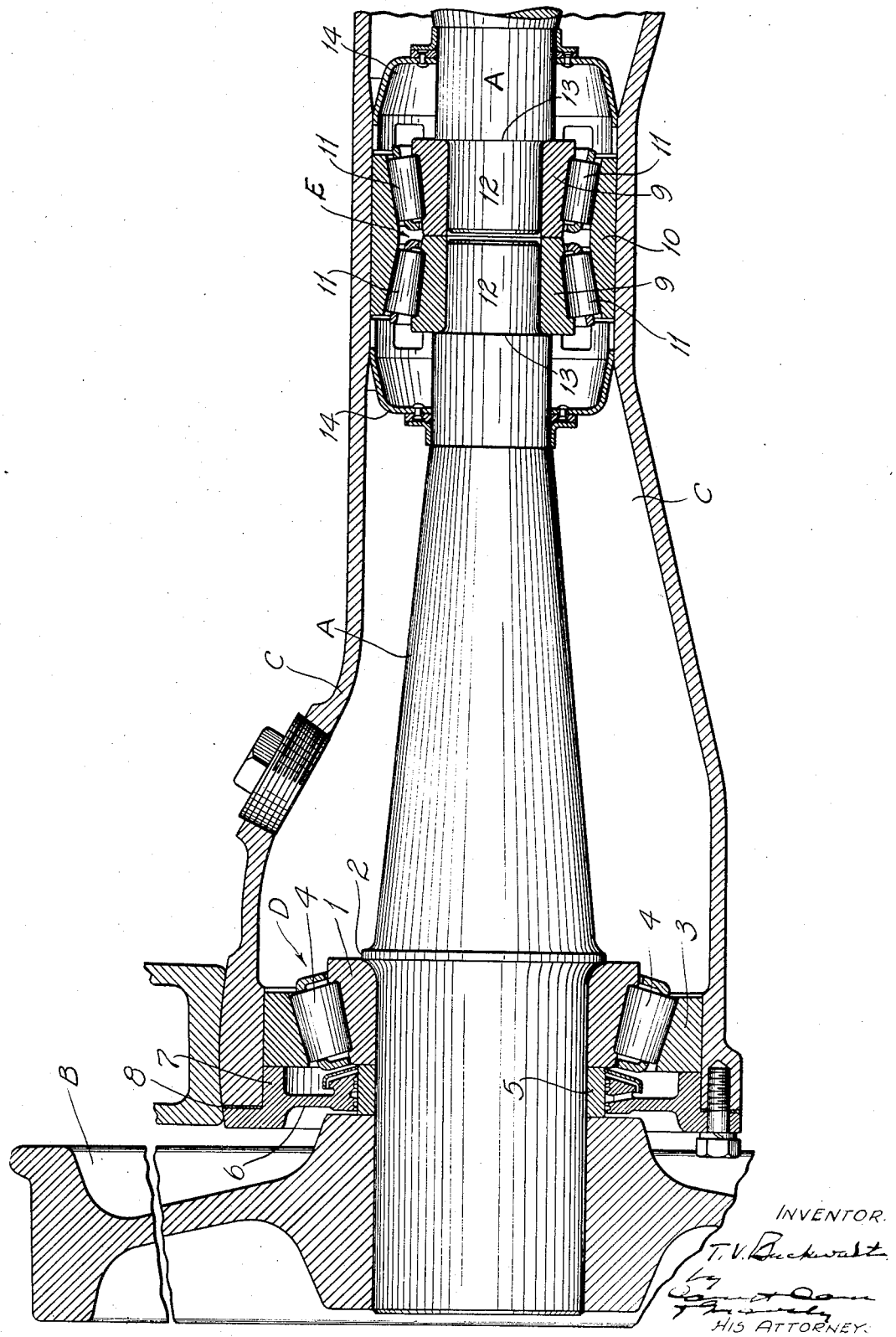

1,762,609

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER-BEARING-AXLE CONSTRUCTION

Application filed August 17, 1929. Serial No. 386,601.

My invention relates to roller bearing axle constructions, particularly to roller bearing railway car axles of the differential type wherein the wheels are fixed to axle sections that are mounted in a housing with taper roller bearings interposed between said sections and said housing at the middle and at the ends of the latter. In such constructions, the end thrust of the axle sections is taken by or transmitted through the taper bearings at the inner ends of the axle sections, thereby necessitating the use of comparatively large inner bearings, axle sections and housings, and thus increasing the cost of the axle and adding considerably to the weight thereof. Accordingly, it is the principal object of the present invention to devise an axle construction of the above type wherein the taper inner bearings are relieved of end thrust of the axle sections, thereby permitting the size of the bearings, axle section and housing to be reduced and thus reducing the cost and weight of the axle construction. Other objetcs are simplicity of construction, ease of assembly and compactness of design. The invention consists in the axle construction and in the parts, combinations and arrangements of parts hereinafter described and claimed.

The accompanying drawing is a vertical longitudinal section through a railway car axle construction embodying my invention.

Referring to the accompanying drawing, my invention is shown with a roller bearing railway car axle of the differential type wherein axially alined counterpart axle sections A have road wheels B fixed on the outer ends thereof and are mounted in an axle housing C, with relatively large conical or taper roller bearings D interposed between the axle sections at the ends of the housing, and with relatively small conical or taper roller bearings E interposed between adjacent inner ends of the axle sections and the inner portion of said housing.

The roller bearings D for the outer ends of the axle sections A comprise cones or inner bearing members 1 pressed on said sections and abutting against shoulders 2 thereon, cups or outer bearing members 3 mounted in the enlarged or flared end portions of the axle housing C, and conical rollers 4 interposed between said cups and cones. Suitable spacing collars 5 are sleeved on the axle sections A between the hubs of the wheels B and the small ends of the bearing cones 1. The enlarged or flared ends of said axle housing C are closed by means of annular closure plates or rings 6 that surround said spacing collars and have inwardly extending annular ribs 7 that abut against the cups 3. Shims 8 are interposed between the closure members 6 and the ends of the axle housing so as to permit adjustment of the bearings.

The conical roller bearings E, which rotatably support the adjacent inner ends of the axle sections A, comprise cones or inner bearing members 9 mounted on said ends of said sections, a doubly coned cup or outer bearing member 10 supported in the axle housing C, and conical rollers 11 interposed between the conical raceways of the cup and the respective cones. As shown in the drawings, the cone receiving portions of the axle sections A are reduced in diameter, as at 12, so that each cone 9 abuts against a shoulder 13 on its axle section. The contacting surfaces of the axle housing C and the doubly coned cup 10 for the inner bearings E are machined or otherwise smoothly finished so that said cup is free to slide longitudinally in said axle housing. The reduced inner ends 12 of the axle sections A are spaced apart; and the two cones 9 thereon have their small ends ground or otherwise smoothly finished and disposed in abutting relation. Suitable means are provided for forming a lubricant chamber for the inner bearings E. In the construction shown in the drawing, each axle section A has an annular closure cup 14 sleeved thereon which bears against the interior surface of the axle housing and thus form between them a lubricant retaining chamber.

With the arrangement described, the end thrust of the axle sections A is transmitted through said sections and the abutting cones 9 at the inner ends thereof from one large end bearing D to the other, thereby relieving the inner bearings of such end thrust and thus permitting the use of smaller and less expensive bearings at the middle of the axle housing. Such arrangement likewise permits the size of the axle sections and housing to be reduced and thus reduces the weight and cost of the axle construction. It also permits the use of taper bearings which may be quickly and easily adjusted to take up looseness and wear of the parts.

What I claim is:

1. A differential railway car axle construction comprising an axle housing, axle sections disposed in said housing with their inner ends spaced apart, conical roller bearings interposed between the outer ends of said axle sections and the outer ends of said housing, and conical roller bearings interposed between the inner ends of said axle sections and said housing, said last mentioned conical roller bearings comprising conical inner bearing members mounted on said axle sections in abutting relation.

2. A differential railway car axle construction comprising an axle housing, axle sections disposed in said housing with their inner ends spaced apart, conical roller bearings interposed between the outer ends of said axle sections and the outer ends of said housing, conical roller bearings interposed between the inner ends of said axle sections and said housing, and slidable with the former longitudinally of the latter, said last mentioned conical roller bearings comprising conical inner bearing members mounted on said axle sections in abutting relation, and means for adjusting said bearings.

3. A differential railway car axle construction comprising an axle housing, axle sections disposed in said housing with their inner ends spaced apart, conical roller bearings interposed between the outer ends of said axle sections and the outer ends of said housing, and conical roller bearings interposed between the inner ends of said axle sections and said housing, said last mentioned conical roller bearings comprising conical inner bearing members mounted on said axle sections in abutting relation, and a common outer bearing member slidable in said housing.

4. A differential railway car axle construction comprising an axle housing, axle sections disposed in said housing with their inner ends spaced apart, conical roller bearings interposed between the outer ends of said axle sections and the outer ends of said housing, and conical roller bearings interposed between the inner ends of said axle sections and said housing and slidable longitudinally of the latter, said last mentioned conical roller bearings comprising conical inner bearing members mounted on said axle sections with their small ends in abutting relation and with their large ends abutting against shoulders provided therefor on said axle sections.

5. A differential axle construction comprising an axle housing, axle sections disposed in said housing with their inner ends spaced apart, conical roller bearings interposed between the outer ends of said axle sections and the outer ends of said housing, conical roller bearings interposed between the inner ends of said axle sections and said housing, and means for transmitting the end thrust of said sections from the bearing at one end of the axle housing to the bearing at the other end thereof without transmitting such thrust through the bearings at the inner ends of said housing.

Signed at Canton, Ohio, this 13th day of Aug., 1929.

TRACY V. BUCKWALTER.